United States Patent
Tamura et al.

(10) Patent No.: US 7,290,887 B2
(45) Date of Patent: Nov. 6, 2007

(54) PROJECTOR AND PROJECTION METHOD

(75) Inventors: Youichi Tamura, Tokyo (JP); Kiyohide Takagi, Tokyo (JP)

(73) Assignee: NEC Display Solutions, Ltd, Tokyo (JP)

( * ) Notice: Subject to any disclaimer, the term of this patent is extended or adjusted under 35 U.S.C. 154(b) by 231 days.

(21) Appl. No.: 10/911,878

(22) Filed: Aug. 5, 2004

(65) Prior Publication Data

US 2005/0073660 A1   Apr. 7, 2005

(30) Foreign Application Priority Data

Aug. 8, 2003   (JP) ............................ 2003-289925

(51) Int. Cl.
*G03B 21/14* (2006.01)
(52) U.S. Cl. ...................................... 353/70
(58) Field of Classification Search ................. 353/69, 353/70
See application file for complete search history.

(56) References Cited

U.S. PATENT DOCUMENTS

| | | | | |
|---|---|---|---|---|
| 5,455,647 A * | 10/1995 | Fujiwara | ..................... | 353/101 |
| 6,416,186 B1 * | 7/2002 | Nakamura | .................... | 353/69 |
| 6,481,855 B2 * | 11/2002 | Oehler | ........................ | 353/70 |
| 6,592,228 B1 * | 7/2003 | Kawashima et al. | ......... | 353/101 |
| 6,846,081 B2 * | 1/2005 | Mochizuki et al. | ........... | 353/70 |
| 6,974,217 B2 * | 12/2005 | Kimura et al. | ................ | 353/69 |
| 2002/0122161 A1 * | 9/2002 | Nishida et al. | ............... | 353/70 |

FOREIGN PATENT DOCUMENTS

| | | |
|---|---|---|
| JP | 04-355740 | 12/1992 |
| JP | 8-9309 | 1/1996 |
| JP | 08-304751 | 11/1996 |
| JP | 10-210360 | 8/1998 |
| JP | 11-305335 | 11/1999 |
| JP | 2000-241874 | 9/2000 |
| JP | 2000-284363 | 10/2000 |
| JP | 2002-062842 | 2/2002 |
| JP | 2002-81922 | 3/2002 |

* cited by examiner

Primary Examiner—William C. Dowling
(74) Attorney, Agent, or Firm—Scully, Scott, Murphy & Presser, P.C.

(57) ABSTRACT

The present invention is addresses to the conventional problem that when the distortion of a projected image that is obliquely projected onto a screen is corrected, an imaging device that is installed near a projection lens for performing an electronic blackboard function directly captures the distortion-corrected image but fails to perform the electronic blackboard function. According to the present invention, an image which is distorted from a rectangular shape into a horizontal and trapezoidal shape in a direction opposite to the direction of the distortion on the screen is displayed on a light bulb and projected through the projection lens. The distortion of the image displayed on the screen is corrected, and the image is visually perceived as a corrected projected image having a rectangular profile. At this time, the imaging device which has captured the corrected projected image outputs a captured image. Since the captured image is distorted, a captured image distortion correcting means is used to correct the distorted captured image into a corrected captured image having a rectangular profile.

5 Claims, 5 Drawing Sheets

Fig.1
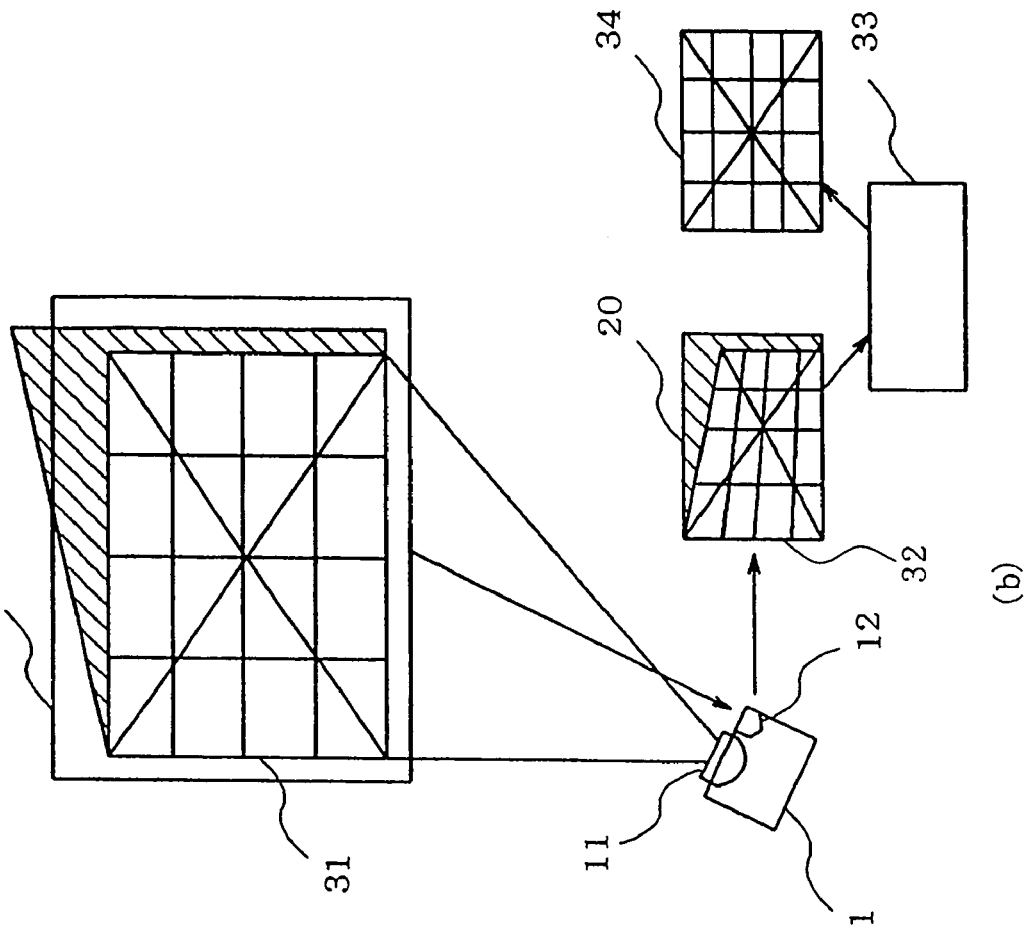
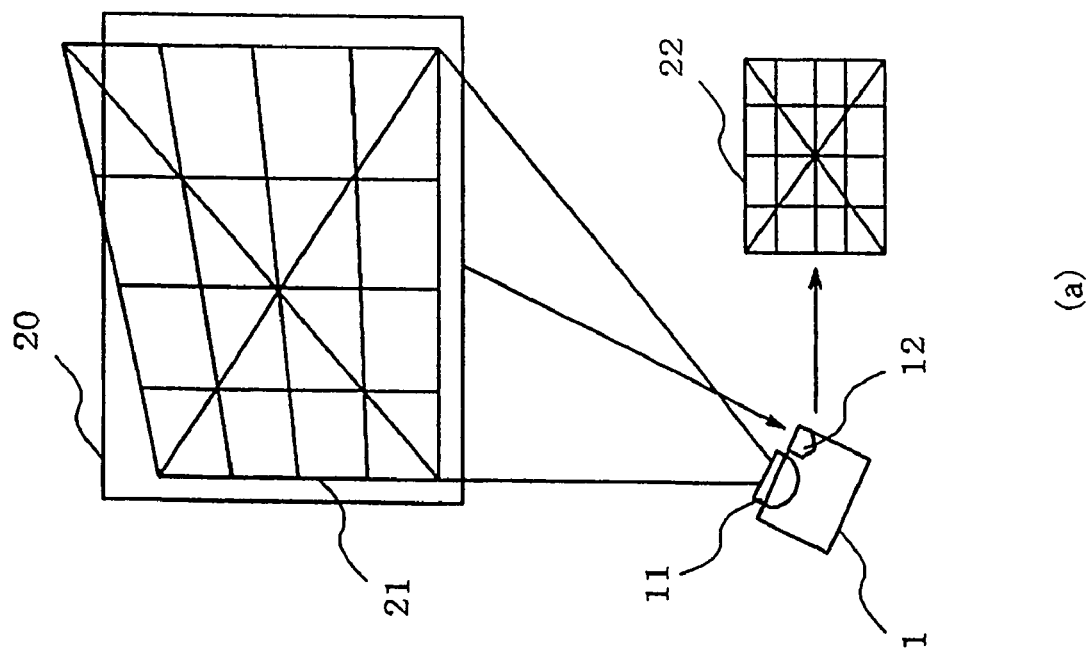

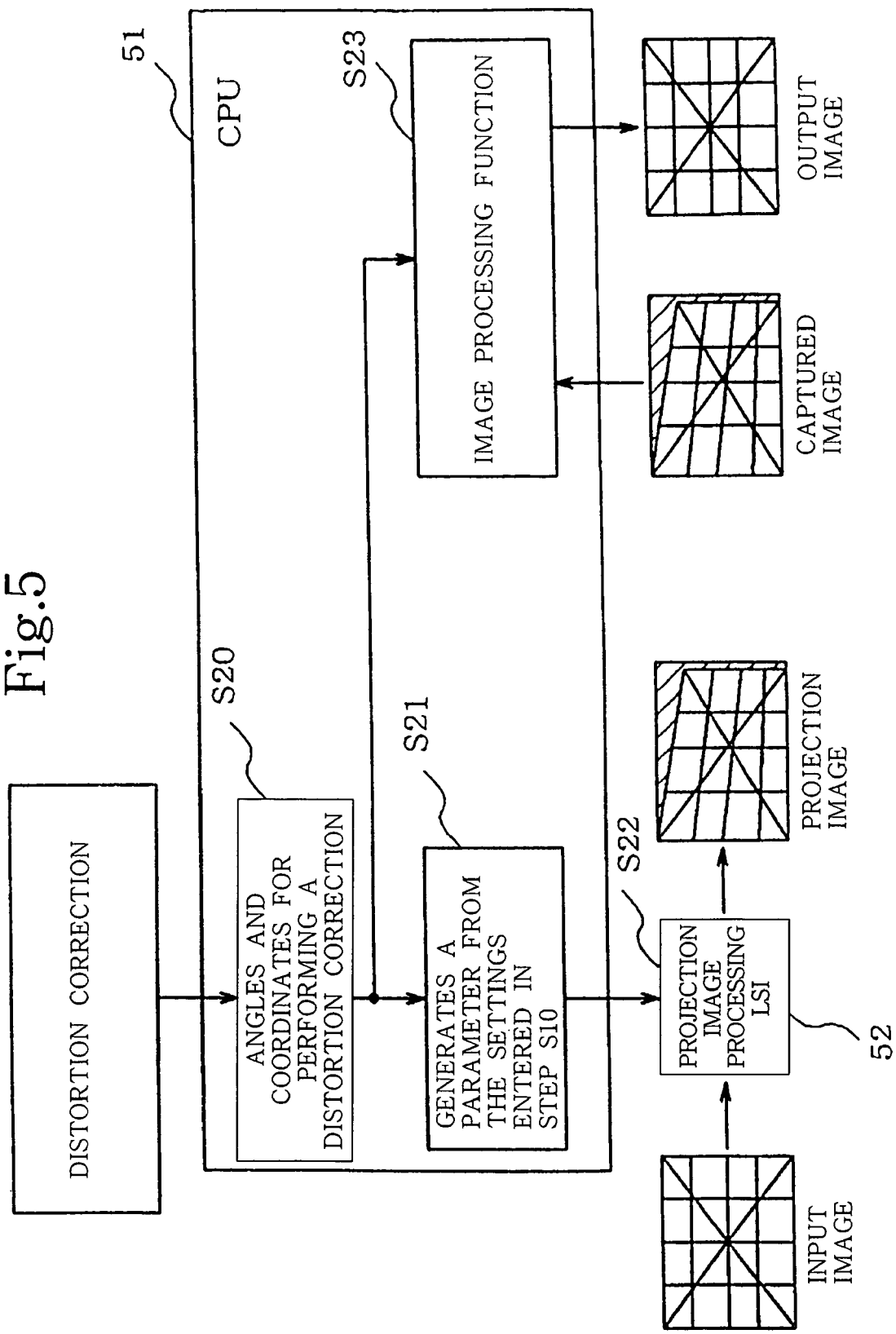

PROJECTOR AND PROJECTION METHOD

TECHNICAL FIELD

The present invention relates to a projection-type image display apparatus, and more particularly to a projector having a projection function to project an image onto a projection surface and an electronic blackboard function to capture an image projected onto the projection surface, the electronic blackboard function being capable of projecting an image obliquely onto the screen and capturing an image projected obliquely onto the screen, and a projection method.

BACKGROUND ART

The invention disclosed in Japanese laid-open patent publication No. 8-304751 is concerned with a projector carrying an imaging device and having an electronic blackboard function to capture an image projected on a projection surface and also to capture graphic figures and characters drawn on the projected image. According to the disclosed invention, a liquid crystal projector for projecting an image onto a screen has a semi-reflecting mirror disposed between a transmissive liquid crystal display panel and a projection optical lens system. The semi-reflecting mirror reflects an image reflected from the screen in a direction other than the transmissive liquid crystal display panel, and the reflected light is captured and converted into a signal by an imaging means.

However, since conventional projectors employ a semi-reflecting mirror, the luminance of the projected image is low. Furthermore, the projector does not have a function, which is sought after by customers in recent years, to project an image obliquely onto the screen and to correct a trapezoidal distortion produced on the projected image.

In order not to sacrifice the projection illuminance, it is necessary to juxtapose the imaging means in the vicinity of the projection lens. There is a commercially available projector which has an imaging device disposed in juxtaposed relation to a projection lens. On such a projector, the imaging device is installed for the purpose of performing such functions as automatic focusing and automatic color correction, not for the purpose of capturing imaging the projected image in its entirety. Therefore, the projector is not used as an electronic blackboard. Though the imaging device which is needed to perform an electronic blackboard function is disposed near the projection lens, it does not have an electronic blackboard function because when the distortion of an image that is projected obliquely onto the screen is corrected, the imaging device would directly capture the distortion-corrected image.

DISCLOSURE OF THE INVENTION

The present invention has been made to solve the problems of projectors that have a conventional electronic blackboard function. It is an object of the present invention to provide a projector which is capable of obliquely projecting an image whose distortion has been corrected without impairing the projection illuminance, and which has an electronic blackboard function including a function to apply a correction, which reverses the distortion of the projected image, to a captured image for thereby canceling out distortion of the captured image.

To achieve the above object, there is provided a projector having projection means for projecting an image displayed on a light bulb at an enlarged scale onto a projection surface and imaging means for imaging the projection surface and outputting a captured image, characterized in that the projection means corrects a distortion caused in the projected image when the image is obliquely projected onto the projection surface, and projects the distortion-corrected image, and the imaging means corrects a distortion caused in the captured image when the projection surface is obliquely imaged, and outputs the distortion-corrected image.

A central optical axis which is obliquely projected and a central optical axis which is obliquely imaged are substantially the same as each other.

The distortion caused in the projected image is corrected by deforming the image displayed on the light bulb, and the distortion caused in the captured image is corrected by processing the captured image.

A first parameter for deforming the image displayed on the light bulb is set from outside of the projector, and a second parameter for processing the captured image is calculated from the first parameter.

The projector further comprises a projection surface detecting means for detecting the relative distance and a relative angle of the projection surface with respect to the projector, and a first parameter for deforming the image displayed on the light bulb is automatically set from the information detected by the projection surface detecting means, and a second parameter for processing the captured image is calculated from the first parameter.

According to the present invention, there is also provided a projector having projection means for projecting an image displayed on a light bulb at an enlarged scale onto a projection surface and an imaging means for imaging the projection surface and outputting a captured image, characterized by projected image distortion correcting means for correcting a distortion caused in the projected image on the projection surface when the image is obliquely projected onto the projection surface, captured image distortion correcting means for correcting a distortion caused in the captured image when the projection surface is obliquely imaged, means for generating a parameter to be set in the projected image distortion correcting means from a setting, and means for generating a parameter to be set in the captured image distortion correcting means from a setting, wherein the projected image distortion correcting means and the captured image distortion correcting means operate in association with each other to output an image which represents the captured image with the distortion corrected.

According to the present invention, there is further provided a projection method for a projector having projection means for projecting an image displayed on a light bulb at an enlarged scale onto a projection surface and imaging means for imaging the projection surface and outputting a captured image, characterized in that the projection means corrects a distortion caused in the projected image when the image is obliquely projected onto the projection surface, and projects the distortion-corrected image, and the imaging means corrects a distortion caused in the captured image when the projection surface is obliquely imaged, and outputs the distortion-corrected image.

A central optical axis which is obliquely projected and a central optical axis which is obliquely imaged are substantially the same as each other.

The distortion caused in the projected image is corrected by deforming the image displayed on the light bulb, and the distortion caused in the captured image is corrected by processing the captured image.

A first parameter for deforming the image displayed on the light bulb is set from outside of the projector, and a second parameter for processing the captured image is calculated from the first parameter.

The projector further comprises projection surface detecting means for detecting the relative distance and relative angle of the projection surface with respect to the projector, and a first parameter for deforming the image displayed on the light bulb is automatically set from information detected by the projection surface detecting means, and a second parameter for processing the captured image is calculated from the first parameter.

In order achieve the above object, there is provided a projector and a projection method for obliquely projecting a distortion-corrected image without impairing the projection illuminance, the projector having an electronic blackboard function including a function to cancel the distortion of the captured image by correcting the captured image through reversing the distortion of the projected image.

BRIEF DESCRIPTION OF THE DRAWINGS

FIG. 1 is a diagram illustrative of the function to be achieved by the present invention;

FIG. 5 is a diagram showing the operational flow of the second embodiment of the present invention.

BEST MODE FOR CARRYING OUT THE INVENTION

Figure 2:
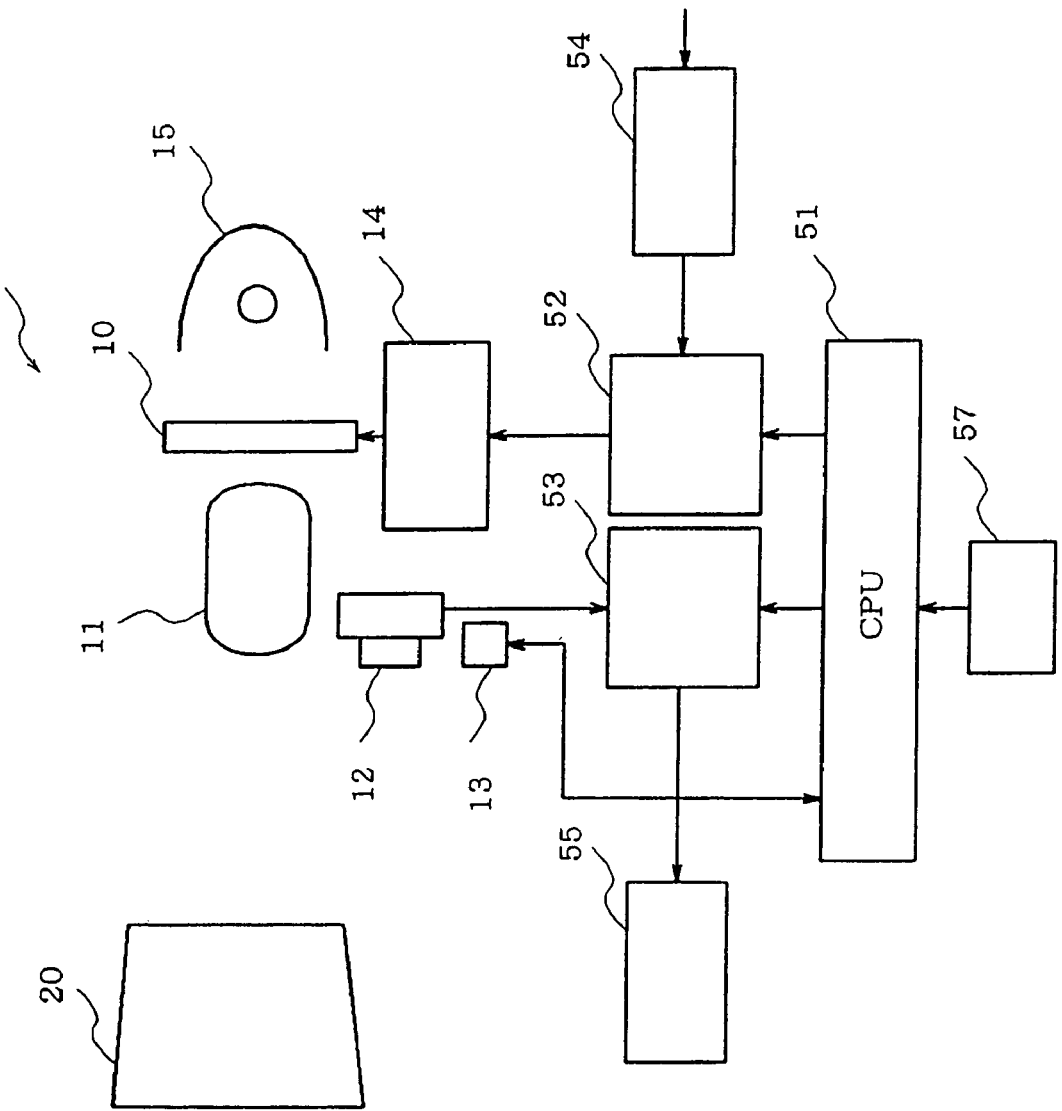
FIG. 2 is a diagram showing an arrangement of the first embodiment of the present invention.

Embodiments of the present invention will be described below with reference to the drawings. FIG. 1 is a diagram illustrative of the function to be achieved by the present invention.

FIGS. 1(a) and 1(b) show projector 1 having projection lens 11 for projecting image light onto screen 20 and imaging device 12 for capturing an image projected on screen 20.

FIG. 1(a) shows an instance where projector 1 has a projected optical axis which is not perpendicular to screen 20, but is inclined at an angle to the horizontal direction (the longitudinal direction of the screen). The oblique projection occurs not only in the horizontal direction, but also in the vertical direction. However, only the oblique projection in the horizontal direction will be described below for the sake of brevity.

Uncorrected projected image 21 on screen 20 is more enlarged in both the horizontal and vertical directions at positions farther from the projector, and has a profile that has been distorted from a rectangular shape into a horizontal trapezoidal shape. However, uncorrected projected image 21, as seen from imaging device 12 disposed closely to projection lens 11, appears as an image which is substantially free of distortions. Though the image as seen from imaging device 12 actually remains slightly distorted due to the aberrations of projection lens 11 and the focusing lens of imaging device 12, it is assumed for the sake of brevity in the description which follows that the image contains no distortion at all. At this time, imaging device 12 produces an output that represents distortion-free captured image 22.

When projector 1 is in actual use, however, a projected image distortion correcting means (not shown) of the projector generates image light which is distorted in a direction opposite to the direction of the distortion on screen 20, and the distorted image light is displayed on a light bulb and projected through projection lens 11. Therefore, the distortion of the image on screen 20 is corrected, and the image is visually perceived as corrected projected image 31 that have been corrected and has a rectangular profile as shown in FIG. 1(b). At this time, imaging device 12, which has captured corrected projected image 31, produces an output representing captured image 32. Captured image 32 is distorted because imaging device 12 obliquely captures the image which has been corrected into a rectangular shape that is projected onto screen 20. Distorted captured image 32 is corrected into corrected captured image 34 having a rectangular profile by captured image distortion correcting means 33. The present invention resides in the fact that the correction of the distortion of the projected image and the correction of the distortion of the captured image are performed in connection with each other.

Embodiment 2

FIG. 2 is a block diagram of an arrangement of an electronic blackboard projector according to the first embodiment of the present invention.

Electronic blackboard projector 1 has light bulb 10, projection lens 11, imaging device 12, screen sensor 13, light bulb driver circuit 14, lamp 15, CPU 51, projection image processing LSI 52, captured image processing LSI 53, image input unit 54, captured image display unit 55, and input unit 57.

Screen sensor 13 comprises an ultrasonic sensor and a means for calculating the direction of the sensing surface of the ultrasonic sensor and the distance up to screen 20. The ultrasonic sensor comprises a piezoelectric flexural oscillator having an oscillating frequency in the range from 40 to 50 kHz. The piezoelectric flexural oscillator is energized by burst pulses having a constant period to deliver ultrasonic pulses into the air, and it detects reflected pulses from screen 20.

The distance to screen 20 is calculated by the ultrasonic sensor under the direction of CPU 51, using an ultrasonic pulse transmitted by the ultrasonic sensor and the detected echo reflected from screen 20. The distance to screen 20 is calculated from the time difference between these two pulses.

The direction of the sensing surface of the ultrasonic sensor is detected as follows: The angle of elevation and the angle of oscillating movement of the ultrasonic sensor are changed and set to angles where the amplitude of the reflected echo is maximum, so that the angle of elevation and the angle of oscillating movement of the ultrasonic sensor which faces screen 20 head on are detected.

The ultrasonic sensor then outputs data representing the distance to screen 20, and the angle of elevation and the angle of oscillating movement to CPU 51.

Figure 3:
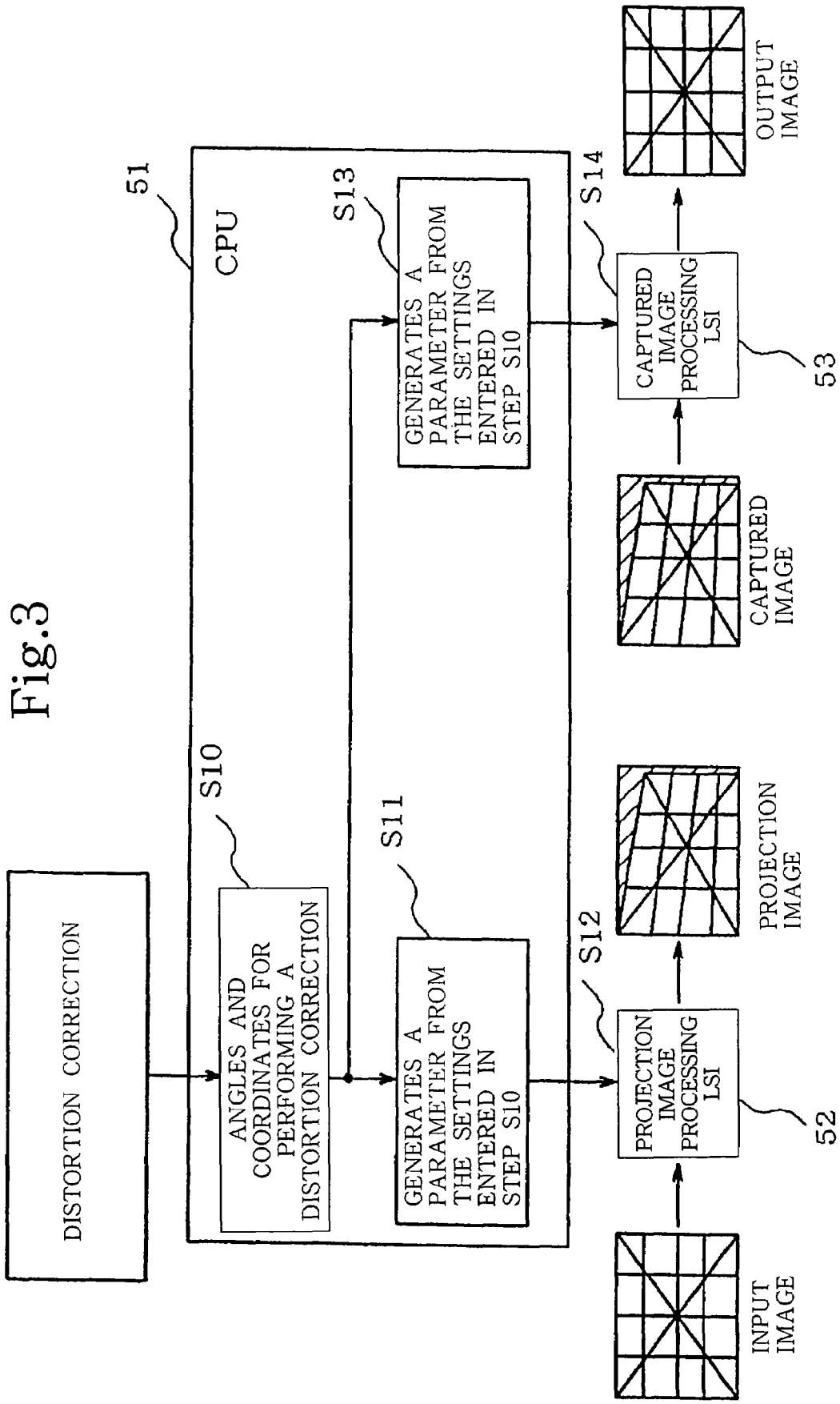
FIG. 3 is a diagram showing the operational flow of the first embodiment of the present invention.

FIG. 3 is a flowchart showing operation of the present embodiment.

First, angles and coordinates for performing a distortion correction to eliminate distortions on an image on the screen are entered (step S10). According to a specific process for entering such angles and coordinates, the user may set coordinates to eliminate distortions on an image on the screen from input unit 57, using an interface such as an OSD (On-Screen Display) image which is displayed on screen 20 by CPU 51, or CPU 51 may set coordinates from the distance to the screen and the angle of elevation and the angle of oscillating movement of the projector with respect to the screen, which have been detected by screen sensor 13.

Then, CPU 51 generates a parameter to be set in projection image processing LSI 52 from the settings entered in step S10 (step S11). Projection image processing LSI 52 processes a rectangular image that is input thereto based on the set parameter, generates a deformed projection image, and writes the projection image into light bulb 10 through light bulb driver circuit 14. Light generated by lamp 15 travels through light bulb 10 and projection lens 11, and is projected as projection image light onto screen 20. In this manner, the distortion of the projected image is corrected (step S12).

At the same time, CPU 51 generates a parameter for captured image processing LSI 53 to cancel the distortion of a captured image from the settings, and sets the parameter in captured image processing LSI 53 (step S13). Captured image processing LSI 53 performs an image processing process to produce a corrected distortion-free output image which has the same shape as the image projected onto the screen, and displays the corrected distortion-free output image on captured image display unit 55 (step S14). At this time, characters, illustrations, and attached materials that are added to the screen are also corrected and displayed on captured image display unit 55.

Embodiment 2

Figure 4:
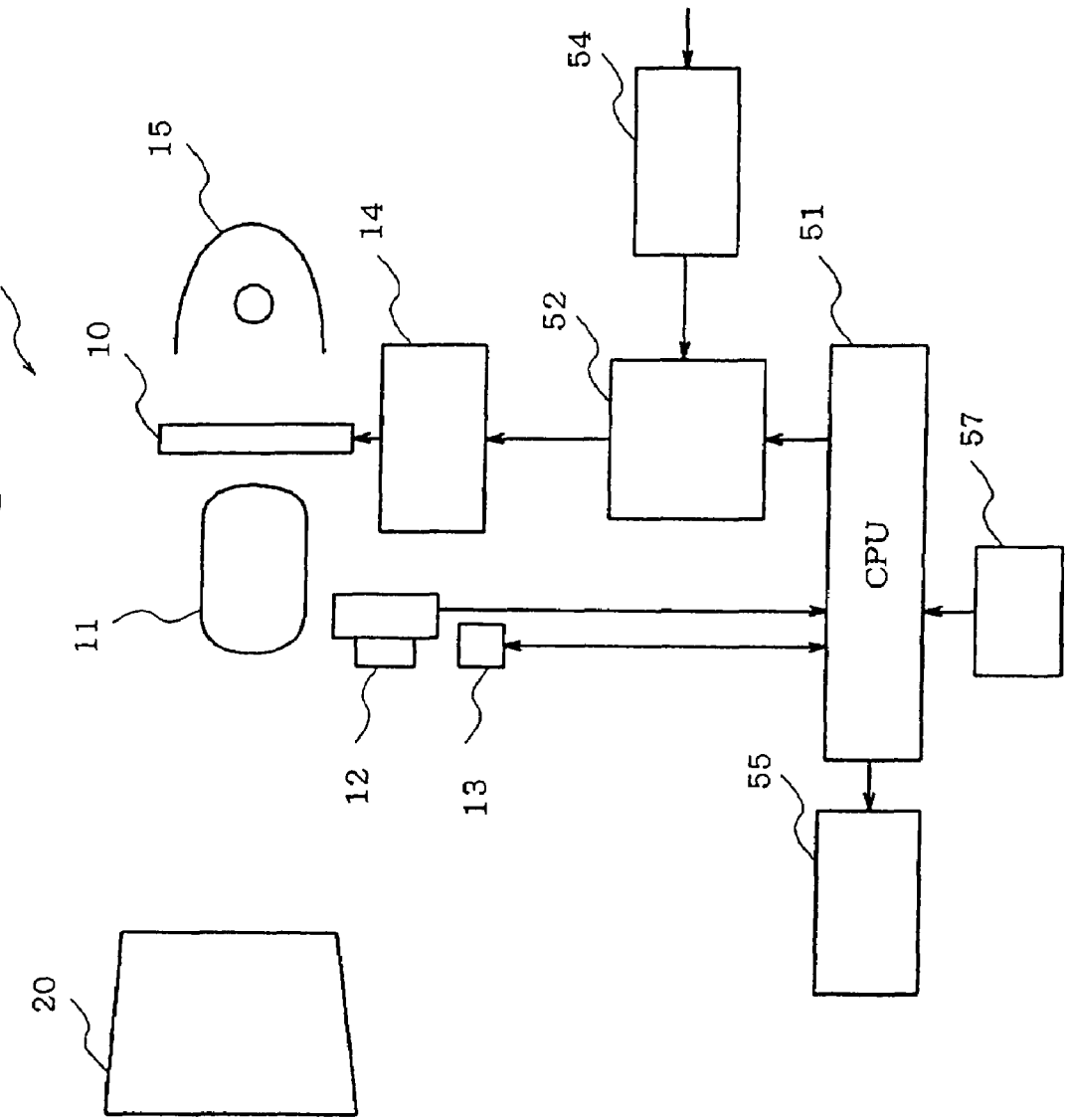
FIG. 4 is a diagram showing an arrangement of the second embodiment of the present invention.

FIG. 4 is a block diagram of an arrangement of an electronic blackboard projector according to the second embodiment of the present invention.

According to the present embodiment, the captured image correcting function of the captured image processing LSI is performed by software-implemented by the CPU. Recent high clock speeds of CPUs are fast enough to cause no problems if the captured image correcting function is performed by the arrangement of the present embodiment. Electronic blackboard projector 1 has light bulb 10, projection lens 11, imaging device 12, screen sensor 13, light bulb driver circuit 14, CPU 51, projection image processing LSI 52, image input unit 54, captured image display unit 55, and input unit 57.

FIG. 5 is a flowchart showing operation of the present embodiment.

First, angles and coordinates for performing a distortion correction to eliminate distortions on an image on the screen are entered (step S20). According to a specific process for entering such angles and coordinates, the user may set coordinates to eliminate distortions on an image on the screen from input unit 57, using an interface such as an OSD (On-Screen Display) image which is displayed on screen 20 by CPU 51, or CPU 51 may set coordinates based on the distance up to the screen and the angle of elevation and the angle of oscillating movement of the projector with respect to the screen, which have been detected by screen sensor 13.

Then, CPU 51 generates a parameter to be set in projection image processing LSI 52 from the settings entered in step S20 (step S21). Projection image processing LSI 52 processes a rectangular image that is input thereto based on the set parameter, generates a deformed projection image, and writes the projection image into light bulb 10 through light bulb driver circuit 14. Light generated by lamp 15 travels through light bulb 10 and projection lens 11, and is projected as projection image light onto screen 20. In this manner, the distortion of the projected image is corrected (step S22).

At the same time, CPU 51 generates an image processing function to cancel the distortion of a captured image having a distorted shape which is output from imaging device 12, from the settings, processes the captured image, and outputs the processed captured image to captured image display unit 55 (step S23). According to the above image processing process, a corrected distortion-free output image which has the same shape as the image projected onto the screen is produced and displayed on captured image display unit 55. At this time, characters, illustrations, and attached materials that are added to the screen are also corrected and displayed on captured image display unit 55.

It has been described with reference to FIG. 1(*a*) that the projected image as seen from imaging device 12, disposed closely to projection lens 11, appears as a rectangular image which is substantially free of distortions. Actually, however, since the projected image contains a distortion caused not only by the aberrations of the lenses but also by the positional displacement between the projection lens and the imaging device, such a distortion is also corrected. If the positional displacement between the projection lens and the imaging device is sufficiently small, e.g., 30 mm, compared with the distance to the screen, then the distortion may be less than 1%, and may not be processed.

The invention claimed is:

1. A projector, comprising:
projection means for projecting an image displayed on a light bulb at an enlarged scale onto a projection surface, imaging means for capturing an image on the projection surface and outputting a captured image, and
projection surface detecting means for detecting the relative distance and the relative angle of said protection surface with respect to said projector, characterized in that;
said projection means corrects a distortion caused in the projected image when the image is obliquely projected onto said projection surface, by means of a first parameter for deforming the image displayed on the light bulb, and projects the distortion-corrected image, said first parameter being automatically set from information detected by the projection surface detecting means;
said imaging means corrects a distortion caused in the captured image when said projection surface is obliquely imaged, by means of a second parameter for processing the captured image, and outputs the distortion-corrected image, said second parameter being calculated from said first parameter.

2. A projector according to claim 1, characterized in that a central optical axis which is obliquely projected and a central optical axis which is obliquely imaged are substantially the same as each other.

3. A projector, comprising:
projection means for projecting an image displayed on a light bulb at an enlarged scale onto a projection surface;
imaging means for capturing an image on the projection surface and outputting the captured image;
projection surface detecting means for detecting the relative distance and the relative angle of said projection surface with respect to said projector;
projected image distortion correction means for correcting a distortion caused in the projected image on said projection surface when the image is obliquely projected onto said projection surface by means of a first parameter for deforming the image displayed on the light bulb, said first parameter is automatically set from information detected by the projection surface detectin means;

captured image distortion correcting means for correcting a distortion caused in the captured image when said projection surface is obliquely imaged by means of a second parameter for processing the captured image, said second parameter being calculated from said first parameter;

wherein said projected image distortion correcting means and said captured image distortion correcting means operate in association with each other to output an image which represents the captured image with the distortion corrected.

4. A projection method for a projector comprising projection means for projecting an image displayed on a light bulb at an enlarged scale onto a projection surface, imaging means for imaging the projection surface and outputting a captured image, and projection surface detecting means for detecting the relative distance and the relative angle of said projection surface, characterized in that:

said projection means corrects a distortion caused in the projected image when the image is obliquely projected onto said projection surface, by means of a first parameter for deforming the image displayed on the light bulb, and projects the distortion-corrected image, said first parameter being automatically set from information detected by the projection surface detecting means;

said imaging means corrects a distortion caused in the captured image when said projection surface is obliquely imaged, by means of a second parameter for processing the captured image, and outputs the distortion-corrected image, said second parameter is calculated from said first parameter.

5. A projection method according to claim 4, characterized in that a central optical axis which is obliquely projected and a central optical axis which is obliquely imaged are substantially the same as each other.

* * * * *